US011056903B2

(12) United States Patent
Lim et al.

(10) Patent No.: US 11,056,903 B2
(45) Date of Patent: Jul. 6, 2021

(54) ELECTRONIC DEVICE INCLUDING BATTERY AND METHOD OF CONTROLLING CHARGING THEREOF

(71) Applicant: Samsung Electronics Co., Ltd., Gyeonggi-do (KR)

(72) Inventors: Chaehoon Lim, Gyeonggi-do (KR); Myunghoon Kwak, Gyeonggi-do (KR); Yongsang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 16/218,599

(22) Filed: Dec. 13, 2018

(65) Prior Publication Data
US 2019/0229547 A1 Jul. 25, 2019

(30) Foreign Application Priority Data
Jan. 25, 2018 (KR) .......................... 10-2018-0009192

(51) Int. Cl.
*H02J 7/00* (2006.01)
*H01M 10/48* (2006.01)
(Continued)

(52) U.S. Cl.
CPC ......... *H02J 7/0071* (2020.01); *H01M 10/425* (2013.01); *H01M 10/44* (2013.01);
(Continued)

(58) Field of Classification Search
CPC ................ H02J 7/0071; H02J 7/00036; H02J 7/007188; H02J 7/007182; H01M 10/48;
(Continued)

(56) References Cited

U.S. PATENT DOCUMENTS 10,250,052 B2 * 4/2019 Patil ........................ H02J 7/045
2010/0019729 A1 1/2010 Kaita et al.
(Continued)

FOREIGN PATENT DOCUMENTS

CN 106571663 A 4/2017
EP 2 953 232 A1 12/2015
(Continued)

OTHER PUBLICATIONS

European Search Report dated Feb. 27, 2020.
International Search Report dated Mar. 28, 2019.
European Search Report dated Jun. 11, 2019.

*Primary Examiner* — Stacy Whitmore
(74) *Attorney, Agent, or Firm* — Cha & Reiter, LLC

(57) ABSTRACT

An electronic device is provided to include a battery and a processor. The processor is configured to identify whether an external power source for charging the battery is connected, identify a voltage of the battery when connection of the external power source is identified, determine a charge start time based on time when the connection of the external power source is identified, determine a charge end time based on situation information of the electronic device, determine a charge stop time of the battery based on the charge start time, the charge end time and the voltage of the battery when a difference between the charge start time and the charge end time satisfies a designated threshold, and divide a period between the charge start time and the charge end time into a first charge section, a charge stop section and a second charge section based on the charge stop time.

20 Claims, 11 Drawing Sheets

(51) Int. Cl.
*H01M 10/44* (2006.01)
*H01M 10/42* (2006.01)

(52) U.S. Cl.
CPC ......... *H01M 10/48* (2013.01); *H02J 7/00036* (2020.01); *H01M 2010/4271* (2013.01); *H02J 7/007182* (2020.01); *H02J 7/007188* (2020.01); *Y02E 60/10* (2013.01)

(58) Field of Classification Search
CPC ............... H01M 10/44; H01M 10/425; H01M 2010/4271
See application file for complete search history.

(56) References Cited

U.S. PATENT DOCUMENTS

| | | |
|---|---|---|
| 2010/0097036 A1 | 4/2010 | Wakayama |
| 2010/0102779 A1 | 4/2010 | Ahn et al. |
| 2011/0175576 A1* | 7/2011 | Uesaka ................. H01M 10/44 320/155 |
| 2013/0002200 A1 | 1/2013 | Kobayashi et al. |
| 2013/0249483 A1 | 9/2013 | Iida |
| 2013/0285608 A1 | 10/2013 | Jikihara |
| 2014/0225573 A1 | 8/2014 | Watanabe et al. |
| 2015/0048786 A1 | 2/2015 | Katsumata et al. |
| 2015/0048803 A1 | 2/2015 | Noh et al. |
| 2015/0288198 A1 | 10/2015 | Cho et al. |
| 2016/0047862 A1 | 2/2016 | Shimizu et al. |
| 2016/0064960 A1 | 3/2016 | DiCarlo et al. |
| 2016/0359339 A1 | 12/2016 | Hwang et al. |
| 2017/0194799 A1 | 7/2017 | Tian et al. |
| 2017/0256973 A1 | 9/2017 | Kim et al. |
| 2019/0260212 A1 | 8/2019 | Li et al. |
| 2019/0334354 A1 | 10/2019 | Mizukami et al. |

FOREIGN PATENT DOCUMENTS

| | | |
|---|---|---|
| EP | 3 484 010 A1 | 5/2019 |
| JP | 2002-142378 A | 5/2002 |
| KR | 10-2015-0019295 A | 2/2015 |
| WO | 2018/012055 A1 | 1/2018 |

* cited by examiner

ELECTRONIC DEVICE INCLUDING BATTERY AND METHOD OF CONTROLLING CHARGING THEREOF

CROSS-REFERENCE TO RELATED APPLICATION(S)

This application is based on and claims priority under 35 U.S.C. § 119 to Korean Patent Application No. 10-2018-0009192, filed on Jan. 25, 2018, in the Korean Intellectual Property Office, the disclosure of which is incorporated by reference herein in its entirety.

BACKGROUND

1. Technical Field

Various embodiments of the present disclosure generally relate to an electronic device that includes a battery and a method of controlling the charging of the battery of the electronic device.

2. Description of Related Art

Today various portable electronic devices, such as smart phones, tablet PCs, portable multimedia players (PMPs), personal digital assistants (PDAs), laptop personal computers (PCs), and wearable devices such as wrist watches and head-mounted displays (HMDs), are available to the public. Such portable electronic devices have been developed to perform various functions, and as such, their processors may consume large amounts of current. Accordingly, there is an increasing need for high-performance batteries for these electronic devices. In particular, lithium ion batteries are widely used because they have advantages such as high energy density, high discharge voltage, output stability, etc.

SUMMARY

When charging a battery, if the full charge voltage for the battery is set high, the hours of use of the electronic device may be increased because the charge capacity of the battery may increase. As power (e.g., voltage and/or current) supplied to the battery is set higher, the time taken to fully charge the battery may be reduced.

As the voltage or current supplied to the battery is set higher, battery deterioration may be accelerated and thus the lifespan of the battery may be reduced. In particular, if voltage or current is supplied based on a predetermined setting value without taking into consideration whether the battery is in a low voltage state or a high voltage state, the deterioration of the battery may be further accelerated. For example, if high voltage or high current is supplied to the battery when it is in a high voltage state, the battery may be more damaged than when the high voltage or high current is supplied to the battery when it is in a low voltage state.

One or more embodiments of the present disclosure may provide a method and electronic device capable of reducing damage to its battery by determining the charge end time of the battery and managing a charge stop section of time during the charging based on the determined charge end time.

One or more embodiments of the present disclosure may provide a method and electronic device capable of reducing damage to its battery by controlling charge speed based on a voltage ratio of the battery.

One or more embodiments of the present disclosure may provide a method and electronic device capable of preventing or reducing battery swelling by reducing the time at which the battery is at its full charge voltage state.

An electronic device according to certain embodiments of the present disclosure includes a battery and at least one processor. The processor may be configured to identify whether an external power source for charging the battery is connected to the electronic device, identify a voltage of the battery when connection of the external power source is identified, determine a charge start time based on at least time when the connection of the external power source is identified, determine a charge end time based on at least situation information related to the electronic device, determine a charge stop time of the battery based on at least the charge start time, the charge end time and the voltage of the battery when a difference between the charge start time and the charge end time satisfies a designated threshold, and divide a period between the charge start time and the charge end time into a first charge section, a charge stop section and a second charge section based on at least the charge stop time and perform the charging of the battery.

An electronic device according to certain embodiments of the present disclosure includes a battery and at least one processor. The processor may be configured to identify whether an external power source for charging the battery is connected to the electronic device, identify a voltage of the battery when connection of the external power source is identified, determine a charge start time based on at least time when the connection of the external power source is identified, determine a charge end time based on at least situation information related to the electronic device, identify whether the voltage of the battery is smaller than a designated charge stop voltage when a difference between the charge start time and the charge end time satisfies a designated threshold, and divide a period between the charge start time and the charge end time into a first charge section, a charge stop section and a second charge section based on at least the designated charge stop voltage when the voltage of the battery is smaller than the designated charge stop voltage and perform the charging of the battery.

A method of controlling the charging of an electronic device including a battery according to certain embodiments of the present disclosure may include identifying whether an external power source for charging the battery is connected to the electronic device, identifying a voltage of the battery when connection of the external power source is identified, determining a charge start time based on at least time when the connection of the external power source is identified, determining a charge end time based on at least situation information related to the electronic device, determining a charge stop time of the battery based on at least the charge start time, the charge end time and the voltage of the battery when a difference between the charge start time and the charge end time satisfies a designated threshold, and dividing a period between the charge start time and the charge end time into a first charge section, a charge stop section and a second charge section based on at least the charge stop time and performing the charging of the battery.

Additional aspects of the present disclosure will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
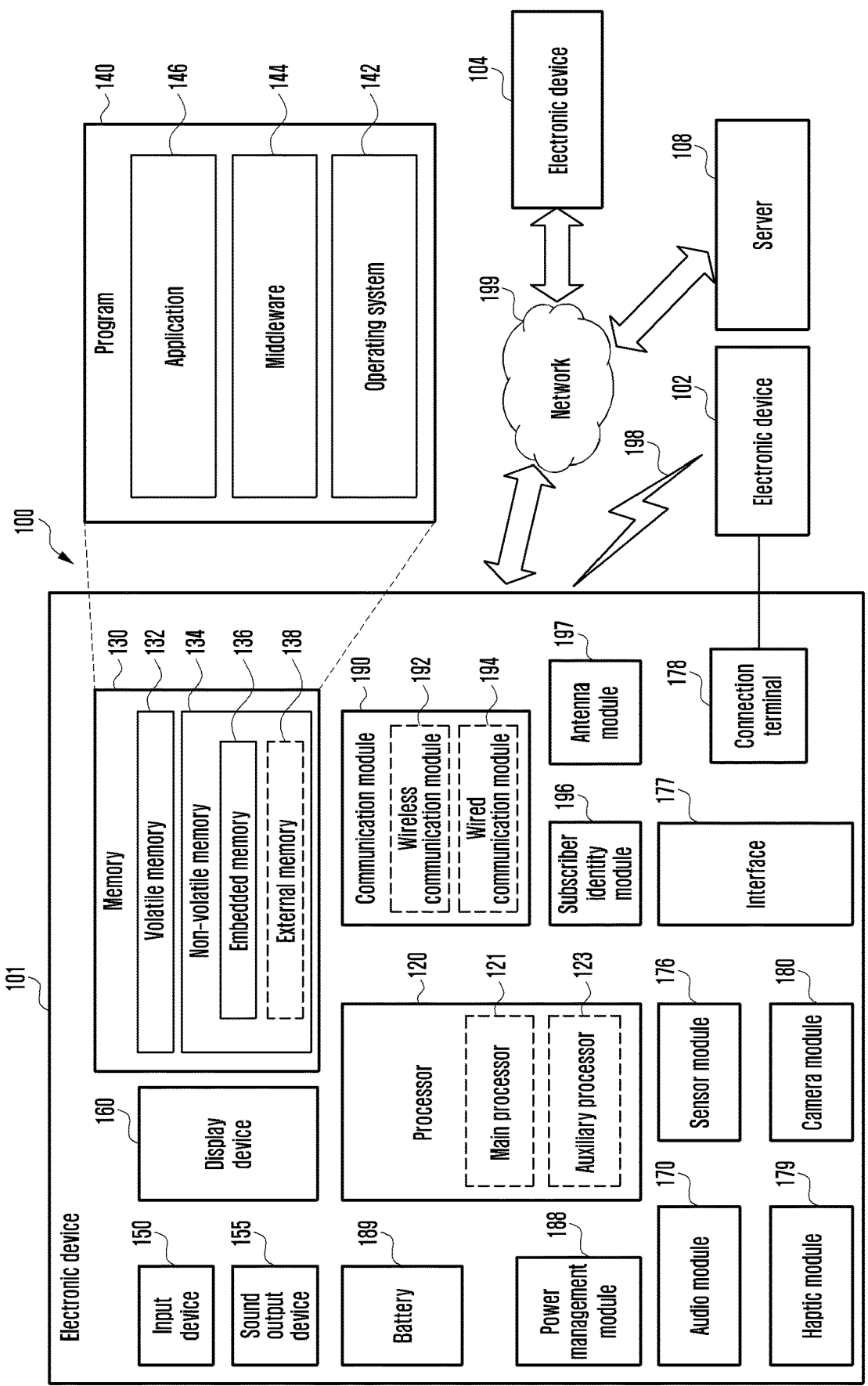
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
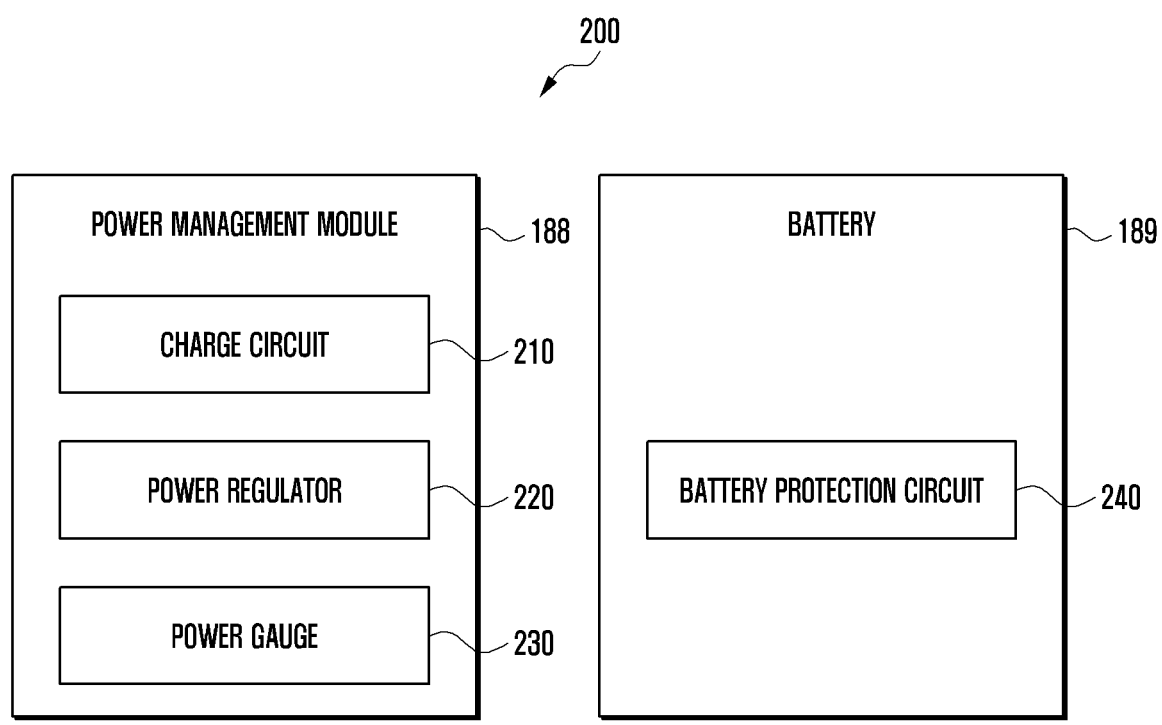
FIG. 2 is a block diagram of a power management module and a battery according to an embodiment of the present disclosure.

FIG. 2 is a block diagram of the power management module 188 and the battery 189 according to an embodiment. Referring to FIG. 2, the power management module 188 may include a charge circuit 210, a power regulator 220 or a power gauge 230. The charge circuit 210 may charge the battery 189 using power supplied from an external power source to the electronic device 101. In accordance with one embodiment, the charge circuit 210 may select a charge method (e.g., normal charge or quick charge) based on the type of external power source (e.g., power adaptor, USB or wireless charge), the amount of power that may be supplied by the external power source (e.g., about 5 watts or more), or the attributes of the battery 189. The charge circuit 210 may then charge the battery 189 using the selected charge method. The external power source may be connected to the electronic device 101 in a wired manner through the connection terminal 178, for example, or may be wirelessly connected to the electronic device 101 through the antenna module 197.

The power regulator 220 may generate a plurality of different voltage or different current levels by controlling the voltage level or current level of the power supplied by the external power source or the battery 189, for example. The power regulator 220 may adjust power of the external power source or the battery 189 to a voltage or current level suitable for each of some of elements included in the electronic device 101. In accordance with one embodiment, the power regulator 220 may be implemented in the form of a low drop out (LDO) regulator or switching regulator. The power gauge 230 may measure information on the use state of the battery 189 (e.g., capacity, charge and discharge levels, voltage or temperature of the battery 189).

The power management module 188 may determine charge state information (e.g., lifespan, overvoltage, low voltage, overcurrent, overcharge, over discharge, overheating and/or short-circuit or swelling) related to the charging of the battery 189 based on at least the measured use state information obtained from the power gauge 230, for example. In alternative embodiments, the use state information may be measured by the charge circuit 210 and/or the voltage regulator 220. The power management module 188 may determine whether the battery 189 is in a normal or abnormal state based on at least some of the determined use state information. If the state of the battery 189 is determined to be abnormal, the power management module 188 may change the charging condition of the battery 189 (e.g., reduce the charge current or voltage or stop charging). In accordance with one embodiment, at least some of the functions of the power management module 188 may be performed by an external controller (e.g., the processor 120).

In accordance with one embodiment, the battery 189 may include a battery protection circuit (e.g., protection circuit module (PCM)) 240. The battery protection circuit 240 may perform one or more functions for preventing the performance deterioration of the battery 189 or damage to the battery 189. For example, the battery protection circuit 240 may perform a pre-blocking function. The battery protection circuit 240, additionally or alternatively, may be configured as at least part of a battery management system (BMS) capable of performing various functions, including cell balancing, capacity measurement, charge and discharge level measurement, temperature measurement or voltage measurement of the battery.

In accordance with one embodiment, at least some of the use state information (hereinafter may also be referred to as "charge state information") of the battery 189 may be measured using corresponding sensors (e.g., temperature sensor) of the sensor module 276, the power gauge 230 or the power management module 188. In accordance with one embodiment, the corresponding sensors (e.g., temperature sensor) of the sensor module 176 may be included as part of the battery protection circuit 140 or may be positioned near the battery 189 as separate devices.

The electronic device 101 according to an embodiment of the present disclosure includes the battery 189 and the at least one processor 120. The processor 120 may be configured to identify whether an external power source for charging the battery 189 has been connected to the electronic device, identify a voltage of the battery 189 when connection of the external power source is identified, determine a charge start time based on at least the time when the connection of the external power source is identified, determine a charge end time based on at least situation information related to the electronic device 101, determine the charge stop time of the battery 189 based on at least the charge start time, the charge end time and the voltage of the battery 189 when a difference between the charge start time and the charge end time satisfies a designated threshold, divide the period between the charge start time and the charge end time into a first charge section, a charge stop section and a second charge section based on at least the charge stop time, and perform the charging of the battery 189. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The processor 120 of the electronic device 101 according to an embodiment of the present disclosure is configured to charge the battery 189 in a first designated mode in the first charge section and to charge the battery in a second designated mode in the second charge section. Charge power is higher in the first designated mode than in the second designated mode.

In accordance with an embodiment of the present disclosure, the processor 120 of the electronic device 101 may set the first designated mode as a power charge mode higher than the second designated mode used in the second charge section, so a charge time in the first designated mode may be faster than a charge time in the second designated mode.

In accordance with an embodiment of the present disclosure, the time taken to charge the battery in the first designated mode (or designated first mode) and the second designated mode (or designated second mode) may be referred to as the charging speed or speed or the various modes. For example, the time may be described as charge speed or first designated speed in the first designated mode, charge speed or second designated speed in the second designated mode, etc.

The processor 120 of the electronic device 101 according to an embodiment of the present disclosure may be configured to charge the battery 189 in a third designated mode having charge power higher than or equal to the charge power in the first designated mode when the difference between the charge start time and the charge end time does not satisfy the designated threshold.

When the difference between the charge start time and the charge end time does not satisfy the designated threshold, the processor 110 of the electronic device 101 according to an embodiment of the present disclosure does not employ the charge stop section and the second designated mode as described below, but may perform the charging of the battery 189 in the first designated mode only. When the difference between the charge start time and the charge end time does not satisfy the designated threshold, the processor 110 of the electronic device 101 according to an embodiment of the present disclosure may not employ the charge stop section, but may divide the period between the charge start time and the charge end time into the first charge section and the second charge section and may perform the charging of the battery 189.

The processor 120 of the electronic device 101 according to an embodiment of the present disclosure may be configured to divide the first charge section into a plurality of sections and to charge the battery 189 in modes respectively designated in the plurality of sections.

The processor 120 of the electronic device 101 according to an embodiment of the present disclosure may be configured to block a voltage or current supplied to the battery 189 in the charge stop section.

The processor 120 of the electronic device 101 according to an embodiment of the present disclosure may be configured to supply a voltage or current from the external power source in the charge stop section so that the battery 189 can maintain a constant voltage state in the charge stop section.

The charge start time of the electronic device 101 according to an embodiment of the present disclosure may be determined based on at least one of the time taken to be connected to an external power source in a wired manner through an connection terminal, the time taken to be wirelessly connected to an external power source through the antenna module, and the time when power starts to be supplied to the battery 189 from the external power source.

The situation information related to the electronic device 101 according to an embodiment of the present disclosure may include at least one of a user's use pattern for the electronic device 101, schedule information of a user stored in the electronic device 101 or an external electronic device, or surrounding environment information of the electronic device 101. The designated threshold of the electronic device 101 according to an embodiment of the present disclosure may include at least one of a predetermined difference between the charge end time and the charge start time and time when a full charge voltage (i.e., a voltage when the battery is full, for example, about 4.5 V) is reached in a normal or high-speed charge mode of the battery 189.

The processor 120 of the electronic device 101 according to an embodiment of the present disclosure may be configured to block a voltage or current supplied to the battery 189 until the voltage of the battery 189 reaches a designated critical voltage after the battery 189 is charged up to a full charge voltage and to charge the battery 189 in a fourth designated mode when the voltage of the battery 189 reaches a designated critical voltage.

The electronic device 101 according to an embodiment of the present disclosure includes the battery 189 and the at least one processor 120. The processor 120 may be configured to identify whether an external power source for charging the battery 189 has been connected to the electronic device, identify a voltage of the battery 189 when connection of the external power source is identified, determine a charge start time based on at least the time when the connection of the external power source is identified, determine a charge end time based on at least situation information related to the electronic device, identify whether the voltage of the battery 189 is smaller than a designated charge stop voltage when a difference between the charge start time and the charge end time satisfies a designated threshold, divide the period between the charge start time and the charge end time into a first charge section, a charge stop section and a second charge section based on at least the charge stop voltage when the voltage of the battery 189 is smaller than the designated charge stop voltage, and perform the charging of the battery 189.

The processor 120 of the electronic device 101 according to an embodiment of the present disclosure may be configured to divide the period between the charge start time and the charge end time into a charge stop section and a charge section when the voltage of the battery 189 is greater than or equal to the designated charge stop voltage.

Figure 3A:
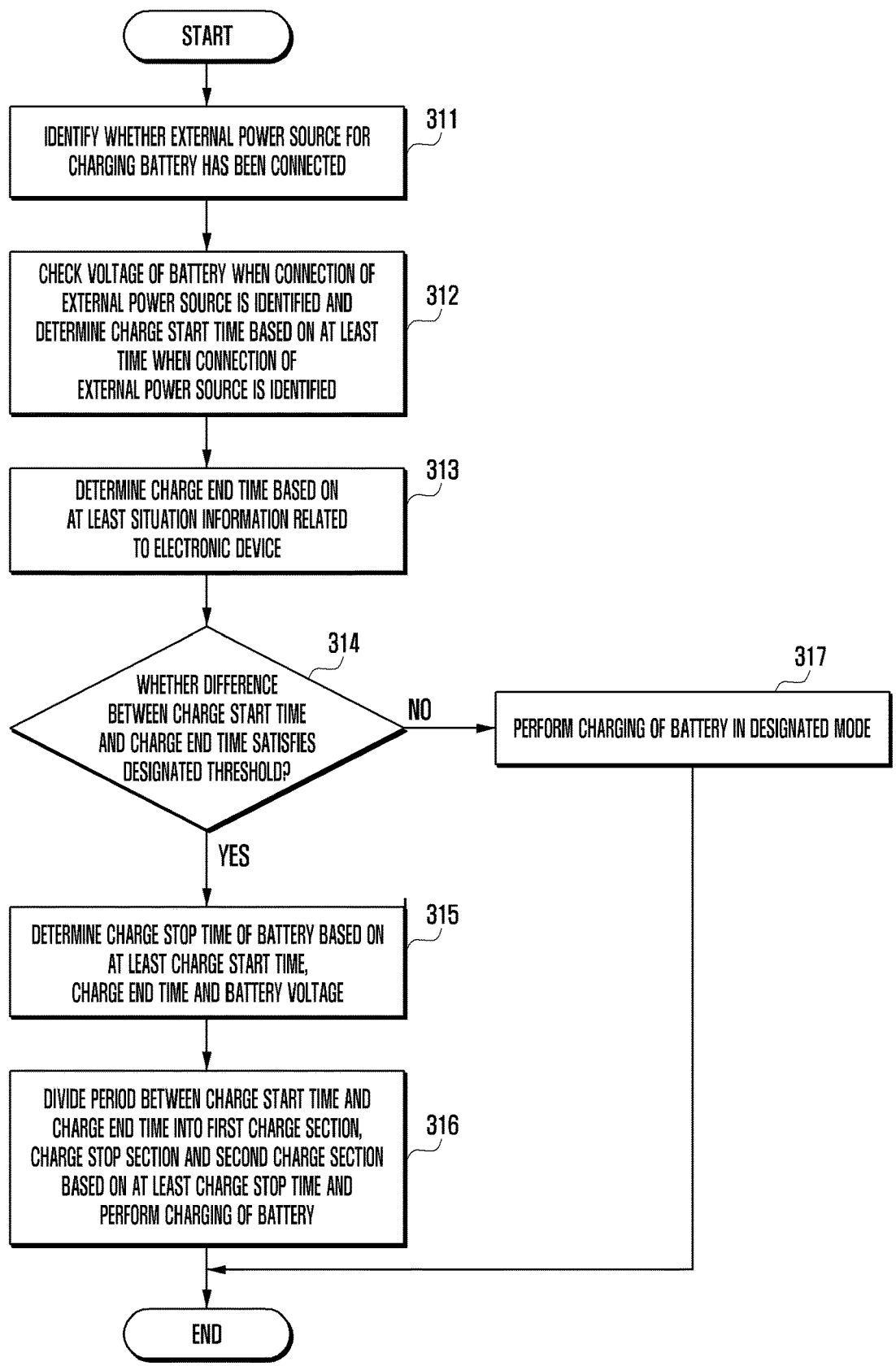
FIG. 3A and FIG. 3B are flowcharts illustrating methods of controlling the charging of a battery according to one or more embodiments of the present disclosure.
Figure 3B:
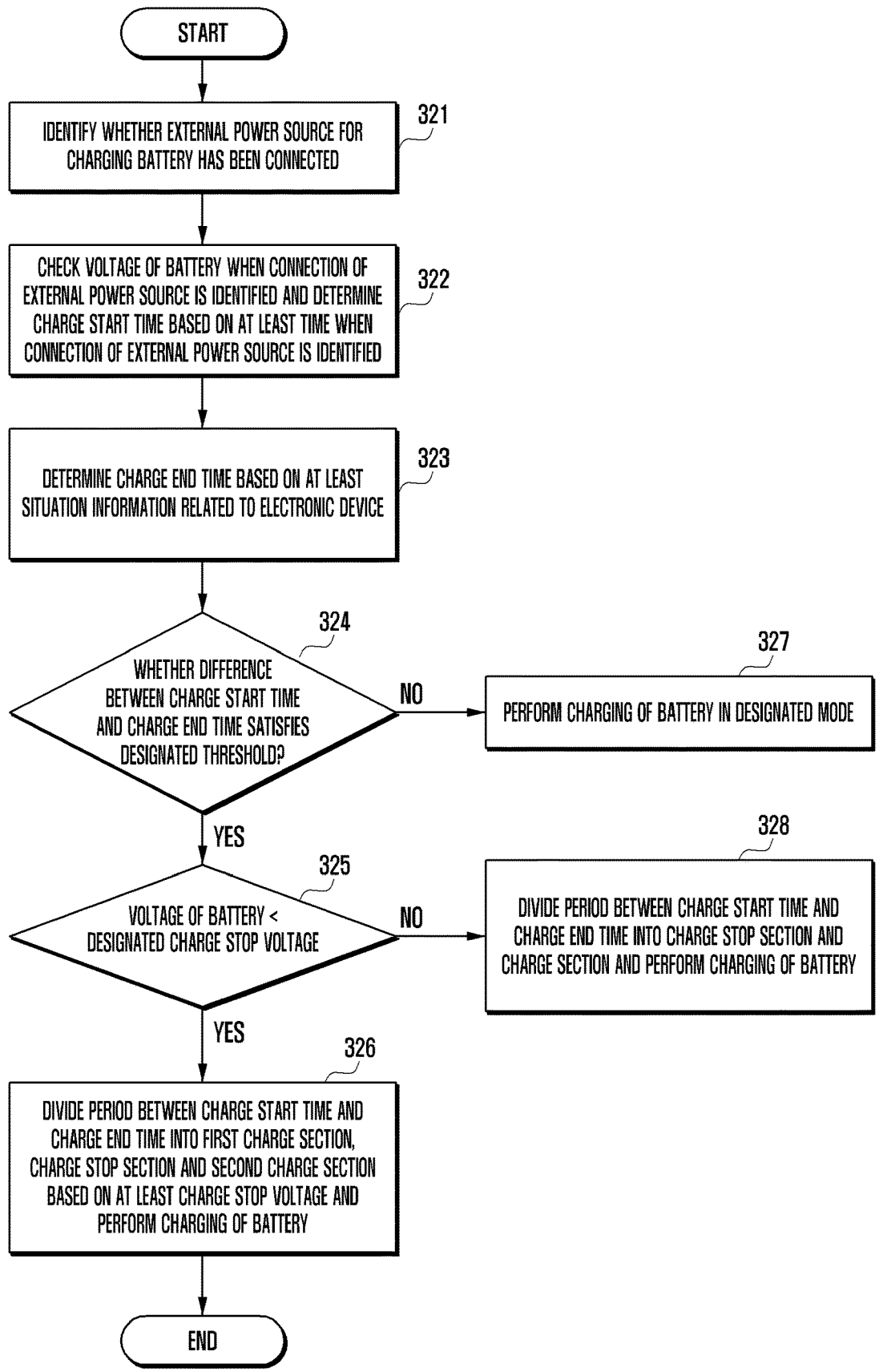

FIGS. 3A and 3B are flowcharts illustrating methods of controlling the charging of the battery 189 according to one or more embodiments.

Referring to FIG. 3A, at operation 311, the processor 120 of the electronic device 101 may identify whether an external power source for charging the battery has been connected. For example, the processor 120 may identify whether the electronic device is connected to the external power source in a wired manner through a connection terminal (e.g., the connection terminal 178 of FIG. 1), such as a power adaptor or USB, or whether the electronic device is wirelessly connected to the external power source through the antenna module (e.g., the antenna module 197 of FIG. 1) of the electronic device 101.

At operation 312, the processor 120 of the electronic device 101 may check a voltage of the battery when the connection of the external power source is identified, and may determine a charge start time based on at least the time when the connection of the external power source is identified.

In accordance with an embodiment, the processor 120 may detect that power is supplied by the external power source and may determine the charge start time. For example, the processor 120 may detect the time when the electronic device 101 is connected to an external power source in a wired manner through a connection terminal, such as a power adaptor or USB, or may detect the time when the electronic device 101 is wirelessly connected to an external power source through the antenna module of the electronic device 101, and may determine the detected time to be the charge start time. In another example, the processor 120 may detect the time when power is supplied to the battery 189 or the time when power starts to be supplied to the battery 189, and may determine the detected time to be the charge start time.

At operation 313, the processor 120 of the electronic device 101 may determine a charge end time based at least on situation information related to the electronic device 101.

In accordance with an embodiment, the situation information related to the electronic device 101 may include the user's use pattern for the electronic device 101. For example, the processor 120 may cumulatively store the user's use pattern for the electronic device 101 in memory, and may determine that long-time charge of the battery 189 (i.e. not quick charge) is appropriate. For example, the processor 120 may analyze the user's sleep pattern, and may determine that long-time charge of the battery 189 is appropriate because the user is sleeping. In another example, the processor 120 may analyze the user's daily routines, and may recognize that long-time charge of the battery 189 is appropriate because the user is in his or her office and will remain there for several hours.

In accordance with an embodiment, the situation information related to the electronic device 101 may include the user's schedule or calendar information stored in the electronic device 101 or an external electronic device 102. For example, the processor 120 may identify an alarm time, set by a user, through an alarm app, and may determine the charge end time. For another example, the processor 120 may identify the user's schedule stored in an external electronic device 102 (e.g., a cloud server), and may determine the charge end time based on the user's schedule. For example, the charge end time may be set to be before or at the start of a specific calendar event.

In accordance with an embodiment, the situation information related to the electronic device 101 may include information on the surrounding environment of the electronic device 101. For example, the processor 120 may obtain information on the location of the electronic device 101 using a GPS sensor, may identify time of sunrise or time of sunset corresponding to the location information, and may determine the charge end time based on the sunrise/sunset times. In another example, the processor 120 may check illumination levels around the electronic device 101 using an illumination sensor and may determine the charge end time based on the illumination level. For example, charge may be ended when the illumination level exceeds a predetermined level.

Therefore, the processor 120 may determine the charge end time based on at least one of the user's use pattern for the electronic device 101, the user's schedule information stored in the electronic device 101 or an external electronic device 102, information on the surrounding environment of the electronic device 101, etc. For example, the processor 120 may operate in the long-time charge mode if the charge start time is identified to be midnight, if it has been identified that the user has set an alarm in the morning, and if the surrounding illumination of the electronic device 101 is identified to be low. In this case, the processor 120 may determine the alarm time set by the user to be the charge end time.

In this embodiment, the electronic device 101 may recognize that the surrounding illumination of the electronic device 101 has temporarily risen above a predetermined level during the long-time charge mode. In this case, the electronic device 101 may identify whether the surrounding illumination exceeds the predetermined level for a designated time period or more, and may determine whether to continue to maintain the long-time charge mode. For example, if the duration in which the surrounding illumination exceeds the predetermined level is less than the designated time period, the electronic device 101 may continue to maintain the long-time charge mode.

In accordance with one embodiment, the user may determine the charge end time by directly inputting the charge end time.

At operation 314, the processor 120 of the electronic device 101 may identify whether the difference between the charge start time and the charge end time satisfies a designated threshold.

For example, when the difference between the charge start time and the charge end time satisfies the designated threshold, the processor 120 may recognize the charging mode as the long-time charge mode. In accordance with an embodiment, when the difference between the charge end time and the charge start time is greater than or equal to a designated time period, the processor 120 may recognize the charging mode as the long-time charge mode. In another example, when the charge end time is slower than the time is takes to reach full charge voltage of the battery 189 when the battery 189 is charged in the normal or high-speed charge mode, the processor 120 may recognize the charging mode as the long-time charge mode. In contrast, when the difference between the charge start time and the charge end time does not satisfy the designated threshold, the processor 120 may recognize the charging mode as the quick-charge mode.

When the difference between the charge start time and the charge end time satisfies the designated threshold, at operation 315, the processor 120 of the electronic device 101 may determine the charge stop time of the battery based on at least the charge start time, the charge end time and the battery voltage.

The charge stop time may be determined based on a charge stop voltage. The charge stop voltage may be determined by taking into consideration the physical properties of the battery 189. For example, the charge stop voltage may be determined by taking into consideration that entropy within the battery 189 increases, and that as the voltage within the battery 189 increases, the ratio between the current supplied to the battery 189 and a negative reactivity current may suddenly rise. In this case, the negative reactivity current means the amount of current or ions that belong to the current or ions supplied for battery charge, but are not penetrated and/or diffused into the negative pole of the battery 189. Charge efficiency may be reduced as the ratio of the negative reactivity current rises. For example, in the case of a lithium ion battery, when 70-80% of the full charge voltage is reached, the phenomenon in which the negative pole of the battery 189 is deteriorated may be suddenly accelerated. In this case, the electronic device may determine 70-80% of the full charge voltage to be the charge stop voltage.

In accordance with one embodiment, a charge stop voltage may be determined based on other information stored in the electronic device 101 or external electronic device 102. For example, the charge stop voltage may be determined by taking into consideration the number of times the battery 189 has been charged or a change in the full charge voltage.

At operation 316, the processor 120 of the electronic device 101 may divide the period between the charge start time and the charge end time into a first charge section, a charge stop section and a second charge section based on at least the charge stop time, and may perform the charging of the battery 189.

In accordance with an embodiment, the first charge section may be a section in which the battery 189 is charged in a first designated mode. For example, the processor 120 may have previously set the first designated mode and supply the battery 189 with a voltage or current according to the first designated mode. In another example, the processor 120 may check the determined charge stop time and charge stop voltage, may set the first designated mode based on the determined charge stop time and charge stop voltage, and may charge the battery 189 according to the first designated mode. In accordance with an embodiment of the present disclosure, the first designated mode may have charging voltage or current higher than those in the second designated mode used in the second charge section so that charging in the first designated mode is faster than charging in the second designated mode.

In accordance with an embodiment, the first charge section may be divided into a plurality of sections. The processor 120 may divide the first charge section into a plurality of sections and charge the battery 189 in modes respectively designated in the plurality of sections. For example, if the first charge section is divided into two sections, the processor 120 may charge the battery 189 in a first mode in the first section and a second mode in the second section. In this case, charge power (i.e. voltage or current) in the first mode may be higher than that in the second mode.

In accordance with an embodiment, the charge stop section may be a section in which the voltage or current supplied to the battery 189 is blocked or a section in which the voltage or current is supplied so that the battery 189 can maintain a constant voltage state. In accordance with an embodiment of the present disclosure, damage to the battery 189 can be prevented due to the charge stop section, where the voltage of the battery 189 remains lower than the full charge voltage.

In accordance with an embodiment, the second charge section may be a section in which the battery 189 is charged in a second designated mode. For example, the processor 120 may have previously set the second designated mode and supply the battery 189 with a voltage or current according to the second designated mode. For another example, the processor 120 may determine the second designated mode by determining the full charge time of the battery 189 and supplying the battery 189 with a voltage or current corresponding to the determined full charge time.

In accordance with an embodiment, charge power in the second designated mode may be set lower than charge power in the first designated mode, for example. The reason for this is that the voltage of the battery 189 in the second charge section is higher than the voltage of the battery 189 in the first charge section. That is, damage to the battery 189 can be reduced by supplying a smaller amount of current or a lower voltage when the voltage within the battery 189 is higher.

In accordance with one embodiment, the first designated mode may be set as a high-speed charge mode, and the second designated mode may be set as a mode in which charging power is lower than charging power in the first designated mode. In this case, since at step 314 it was determined that the time to charge the battery can be relatively long (i.e. exceeding the designated threshold), the second charge section can be managed to be longer than the other sections.

In accordance with an embodiment, the second charge section may be divided into a plurality of sections. The processor 120 may divide the second charge section into a plurality of sections and charge the battery 189 in modes respectively designated in the plurality of sections. For example, if the second charge section is divided into two sections, the processor 120 may charge the battery 189 in a first mode in the first section and charge the battery 189 in a second mode in the second section. In this case, charge power in the first mode may be higher than charge power in the second mode. In accordance with an embodiment, in the second charge section, the processor 120 may charge the voltage of the battery 189 up to the full charge voltage. Furthermore, the time taken to charge the battery 189 up to the full charge voltage may be equal to or faster than the charge end time. In accordance with one embodiment, the processor 120 may determine the second designated mode so that the charging of the battery is terminated at the charge end time. For example, the processor 120 may determine the second designated mode by taking into consideration the period between the time when the second charge section starts and the charge end time, the time left until the battery reaches full charge voltage, etc., and may perform the charging of the battery based on the determined second designated mode.

In accordance with an embodiment, the processor 120 may control the battery 189 to reach full charge voltage prior to the charge end time. When the battery 189 is charged up to the full charge voltage, the processor 120 may switch the state of the battery 189 from a charged state to a discharged state. In another embodiment, the processor 120 may control the battery 189 to maintain a constant full charge voltage state in the charge stop section previously described. For example, the processor 120 may block the voltage or current supplied to the battery 189 until the voltage of the battery 189 reaches a first designated voltage, and may charge the battery 189 in a fourth designated mode when the voltage of the battery 189 reaches the first designated voltage. In this case, the fourth charging speed in the fourth designated mode may be slower than or equal to the charging speeds in the first and second charge sections.

Referring back to operation 314, when the difference between the charge start time and the charge end time does not satisfy the designated threshold, at operation 317, the processor 120 of the electronic device 101 may perform the charging of the battery in a designated mode.

In accordance with an embodiment, the processor 120 may charge the battery 189 in a third designated mode. The third designated mode is used when a short-period charge situation is recognized, so charge power in the third designated mode may be higher than or equal to charge power in the first designated mode. For example, charge speed in the third designated mode may be faster than charge speed in the first designated mode by setting power in the third designated mode higher than power in the first designated mode. For example, the third designated mode may be a quick-charge or high-speed charge mode.

In accordance with an embodiment, when a short-period charge situation is recognized, the processor 110 of the electronic device 101 may divide the period between the charge start time and the charge end time into a first charge section and a second charge section. In this example, the processor 110 may not determine a charge stop section. The processor may charge the battery in a first designated mode in the first charge section, and may charge the battery in a second designated mode in the second charge section. Furthermore, charge speed in the first designated mode may be faster than the charge speed in the second designated mode because charge power in the first designated mode may be higher than the charge power in the second designated mode.

A method of controlling the charge of an electronic device including a battery according to an embodiment of the present disclosure include operations of identifying whether an external power source for charging the battery is connected to the electronic device, identifying a voltage of the battery when connection of the external power source is identified, determining a charge start time based on at least time when the connection of the external power source is identified, determining a charge end time based on at least situation information related to the electronic device, determining a charge stop time of the battery based on at least the charge start time, the charge end time and the voltage of the battery when a difference between the charge start time and the charge end time satisfies a designated threshold, and dividing a period between the charge start time and the charge end time into a first charge section, a charge stop section and a second charge section based on at least the charge stop time and performing the charging of the battery.

A method of controlling the charge of an electronic device including a battery according to an embodiment of the present disclosure may include operations of charging the battery in a first designated mode in the first charge section and charging the battery in a second designated mode in the second charge section. Charge power in the first designated mode may be higher than charge power in the second designated mode.

A method of controlling the charge of an electronic device including a battery according to an embodiment of the present disclosure may include an operation of charging the battery with charge power in a third designated mode higher than or equal to the charge power in the first designated mode when the difference between the charge start time and the charge end time does not satisfy the designated threshold.

A method of controlling the charge of an electronic device including a battery according to an embodiment of the present disclosure may include operations of dividing the first charge section into a plurality of sections and charging the battery in modes respectively designated in the plurality of sections.

A method of controlling the charge of an electronic device including a battery according to an embodiment of the present disclosure may include an operation of blocking a voltage or current supplied to the battery in the charge stop section.

A method of controlling the charge of an electronic device including a battery according to an embodiment of the present disclosure may include an operation of supplying a voltage or current from the external power source in the charge stop section so that the battery maintains a constant voltage state in the charge stop section.

A method of controlling the charge of an electronic device including a battery according to an embodiment of the present disclosure may further include operations of blocking a voltage or current supplied to the battery until the voltage of the battery reaches a designated critical voltage after the battery is charged up to a full charge voltage and charging the battery in a fourth designated mode when the voltage of the battery reaches the designated critical voltage.

Referring to FIG. 3B, at operation 321, the processor 120 of the electronic device 101 may identify whether an external power source for charging the battery has been connected.

At operation 322, the processor 120 of the electronic device 101 may check a voltage of the battery when the connection of the external power source is identified, and may determine a charge start time based on at least the time when the connection of the external power source is identified.

At operation 323, the processor 120 of the electronic device 101 may determine a charge end time based at least on situation information related to the electronic device 101.

At operation 324, the processor 120 of the electronic device 101 may identify whether the difference between the charge start time and the charge end time satisfies a designated threshold.

Operation 321 to operation 324 are substantially the same as operation 311 to operation 314 of FIG. 3A, and a detailed description thereof is omitted.

When the difference between the charge start time and the charge end time satisfies the designated threshold, the processor 120 of the electronic device 101 identifies whether the voltage of the battery 189 is smaller than a designated charge stop voltage at operation 325.

The charge stop voltage may be a value designated by the user or the electronic device 101. In accordance with another embodiment, the charge stop voltage may be determined by taking into consideration the physical properties of the battery 189. For example, the charge stop voltage may be determined by taking into consideration that entropy within the battery 189 increases, and that as the voltage within the battery 189 increases, the ratio between the current supplied to the battery 189 and the negative reactivity current may suddenly rise. For example, in the case of a lithium ion battery, when 70-80% of the full charge voltage is reached, the phenomenon in which the negative pole of the battery 189 is deteriorated is suddenly accelerated, and some of the ions in the supplied current forms a film without penetrating (or diffusing) into the negative pole of the battery 189. Accordingly, 70-80% of the full charge voltage may be determined to be the charge stop voltage.

In one embodiment, the charge stop voltage may be determined for user convenience. For example, the user may forcibly terminate the charging of the battery prior to the charge end time expected by the electronic device. Accordingly, 70-80% of the full charge voltage may be determined to be the charge stop voltage in order to prevent inconvenience for the user who has to forcibly terminate charging.

In accordance with an embodiment, the processor 120 may determine the charge stop voltage based on information stored in the electronic device 101 or the external electronic device 102. For example, the charge stop voltage may be determined by taking into consideration the number of times the battery 189 has been charged or a change in the full charge voltage. The charge stop voltage of the battery 189 may be increased as the battery 189 is used because the power stored in the battery 189 at the same full charge voltage may be reduced as the number of times that the battery 189 is used is increased. On the other hand, the charge stop voltage of the battery 189 may be decreased as the battery 189 is used because the stability of the battery 189 may be reduced as the number of times that the battery 189 is used is increased.

When the voltage of the battery 189 is smaller than the designated charge stop voltage, at operation 326, the processor 120 of the electronic device 101 may divide the period between the charge start time and the charge end time into a first charge section, a charge stop section and a second charge section based on at least the charge stop voltage, and may perform the charging of the battery. Operation 326 is substantially the same as operation 316 of FIG. 3A, and thus a detailed description thereof is omitted.

Referring back to operation 324, when the difference between the charge start time and the charge end time does not satisfy the designated threshold, at operation 327, the processor 120 of the electronic device 101 may perform the charging of the battery 189 in a designated mode. Operation 327 is substantially the same as operation 317 of FIG. 3A, and thus a detailed description thereof is omitted.

Referring back to operation 325, when the voltage of the battery 189 is greater than or equal to the designated charge stop voltage, at operation 328, the processor 120 of the electronic device 101 may divide the period between the charge start time and the charge end time into a charge stop section and a charge section, and may perform the charging of the battery 189.

In accordance with an embodiment, when the voltage of the battery 189 is higher than the charge stop voltage, the processor 120 may block the voltage or current supplied to the battery 189 until the voltage of the battery 189 reaches the charge stop voltage. Furthermore, when the voltage of the battery 189 reaches the charge stop voltage, the processor 120 may block the voltage or current supplied to the battery 189 or may supply the voltage or current to the battery 189 so that the battery 189 maintains a constant voltage state.

In accordance with an embodiment, if the processor 120 does not determine a charge stop voltage, it may perform the charging of the battery 189 in a fifth designated mode. For example, the processor 120 may determine the fifth designated mode so that the charging of the battery is terminated at the charge end time. For example, the processor 120 may determine the fifth designated mode by taking into consideration the period between the charge start time and the charge end time and the time left until the battery reaches full charge, and may perform the charging of the battery based on the determined fifth designated mode.

Figure 4:
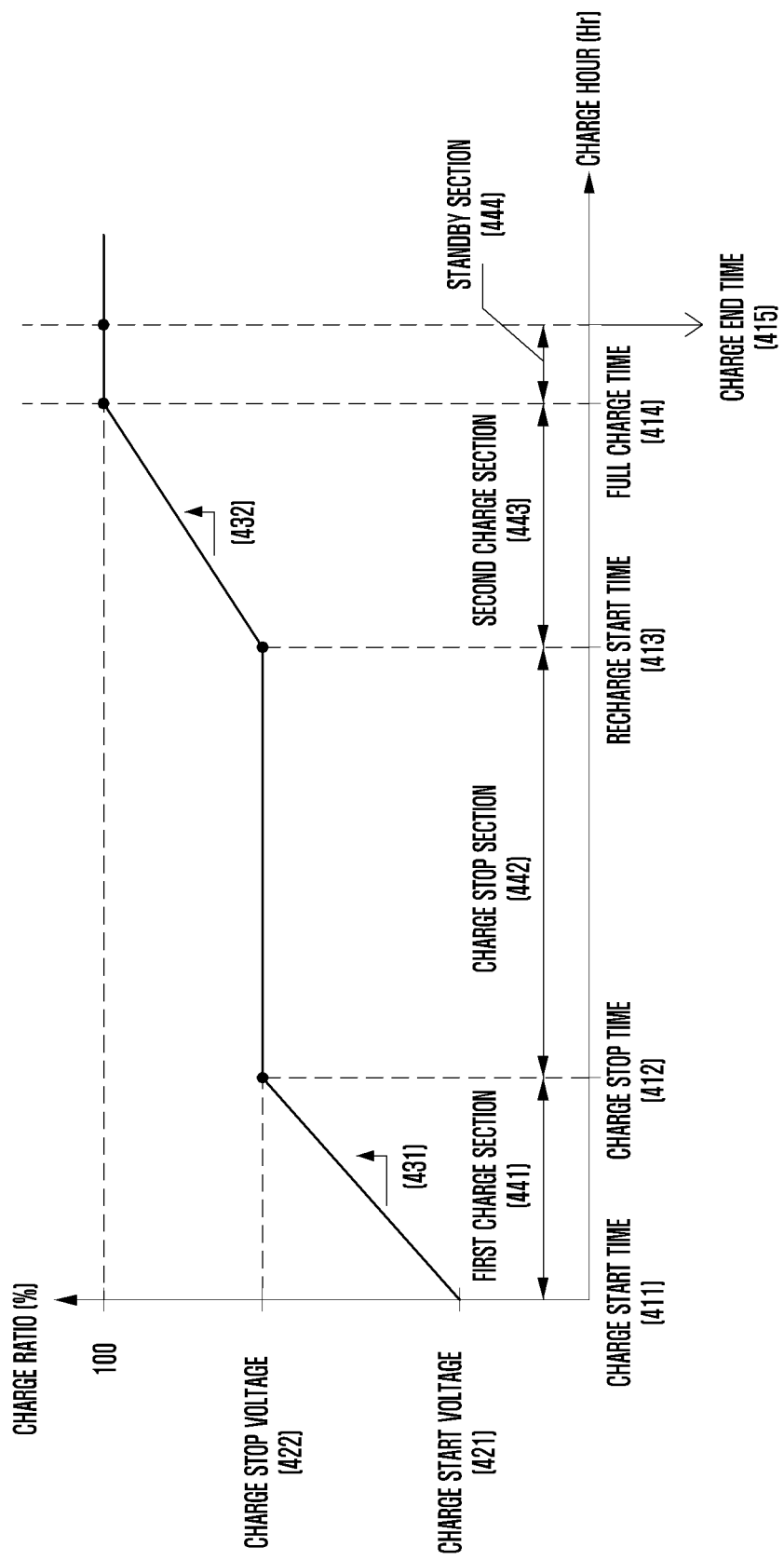
FIG. 4 is a graph showing changes in the voltage of the battery according to an embodiment of the present disclosure.

FIG. 4 is a graph showing changes in the voltage of the battery 189 according to an embodiment of the present disclosure.

Referring to FIG. 4, when the connection of an external power source is identified, the processor 120 may check the voltage of the battery and determine a charge start time 411 based on the time when the external power source is connected. The processor 120 may detect the time when the external power source is connected in a wired manner through a connection terminal, may detect the time when the external power source is wirelessly connected through the antenna module. Alternatively, the processor 120 may detect the time at which power starts to be supplied to the battery 189, and may determine the detected time to be the charge start time 411.

When the charge start time 411 is identified and a charge start voltage 421 is determined, the processor 120 may determine a charge end time 415 based on at least situation information related to the electronic device 101. The situation information related to the electronic device 101 may include at least one of the user's use pattern for the electronic device 101, the user's schedule information stored in the electronic device 101 or an external electronic device 101, or information on the surrounding environment of the electronic device 101.

When the charge end time 415 is determined, the processor 120 may identify whether the difference between the charge start time 411 and the charge end time 415 satisfies a designated threshold. When the designated threshold is satisfied, the processor 120 may determine the charge stop time 412 and/or charge stop voltage 422. Furthermore, the processor 120 may determine a recharge start time 413 when a charge stop section 442 is terminated.

Thereafter, the processor 120 may divide the charge period of the battery 189 into a first charge section 441, the charge stop section 442 and a second charge section 443 based on the charge stop time 412 or the charge stop voltage 422. For example, the processor 120 may charge the battery 189 in a first designated mode 431 in the first charge section 441, may control the charging of the battery 189 to be stopped in the charge stop section 442 or control the battery 189 to maintain a charge stop voltage, and may charge the battery 189 in a second designated mode 432 in the second charge section 443. Furthermore, charging speed in the second designated mode 432 may be set slower than that of the first designated mode 431.

In the second charge section 443, the processor 120 may charge the battery 189 up to the full charge voltage. Furthermore, the full charge time 414 may occur sooner than the charge end time 415 or be the same as the charge end time 415. Accordingly, the processor 120 may manage a section from the full charge time 414 to the charge end time 415 as a standby section 444.

Figure 5:
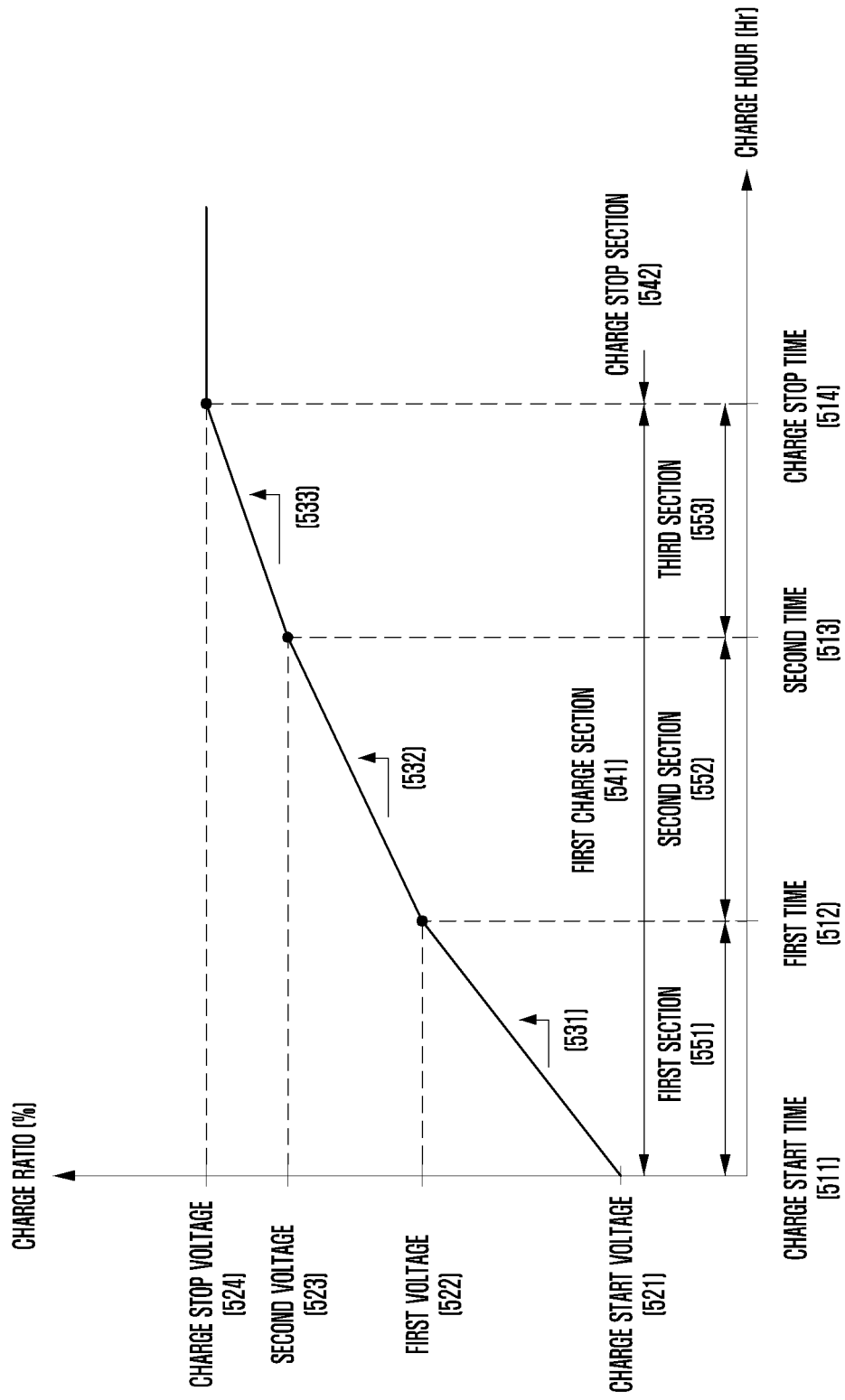
FIG. 5 is a graph showing a first charge section according to an embodiment of the present disclosure.

FIG. 5 is a graph showing a first charge section according to an embodiment of the present disclosure.

In accordance with an embodiment, the first charge section 541 (e.g., the first charge section 441 of FIG. 4) may be divided into a plurality of sections. For example, the processor 120 may divide the first charge section 541 into a plurality of sections and charge the battery 189 in modes respectively designated in the plurality of sections.

FIG. 5 shows a case where the first charge section 541 is divided into three sections before a charge stop section 542 (e.g., the charge stop section 442 of FIG. 4) is reached. For example, the period from charge start time 511 (e.g., the charge start time 411 of FIG. 4) to first time 512 may be classified as a first section 551, the period from the first time 512 to second time 513 may be classified as a second section 552, and the period from the second time 513 to charge stop time 514 (e.g., the charge stop time 412 of FIG. 4) may be classified as a third section 553.

The processor 120 may increase the voltage of the battery 189 from charge start voltage 521 (e.g., the charge start voltage 421 of FIG. 4) to first voltage 522 by charging the battery in a first mode 531 in the first section 551. Furthermore, the processor 120 may increase the voltage of the battery 189 from the first voltage 522 to second voltage 523 by charging the battery in a second mode 532 in the second section 552. Furthermore, the processor 120 may increase the voltage of the battery 189 from the second voltage 523 to charge stop voltage 524 (e.g., the charge stop voltage 422 of FIG. 4) by charging the battery in a third mode 533 in the third section 553. In this case, charging time in the first mode 531 may be set faster than that in the second mode 532, and charging time in the second mode 532 may be set faster than that in the third mode 533. That is, damage to the battery 189 can be reduced by supplying an increasingly smaller amount of current or an increasingly lower voltage as the voltage of the battery 189 rises.

Figure 6:
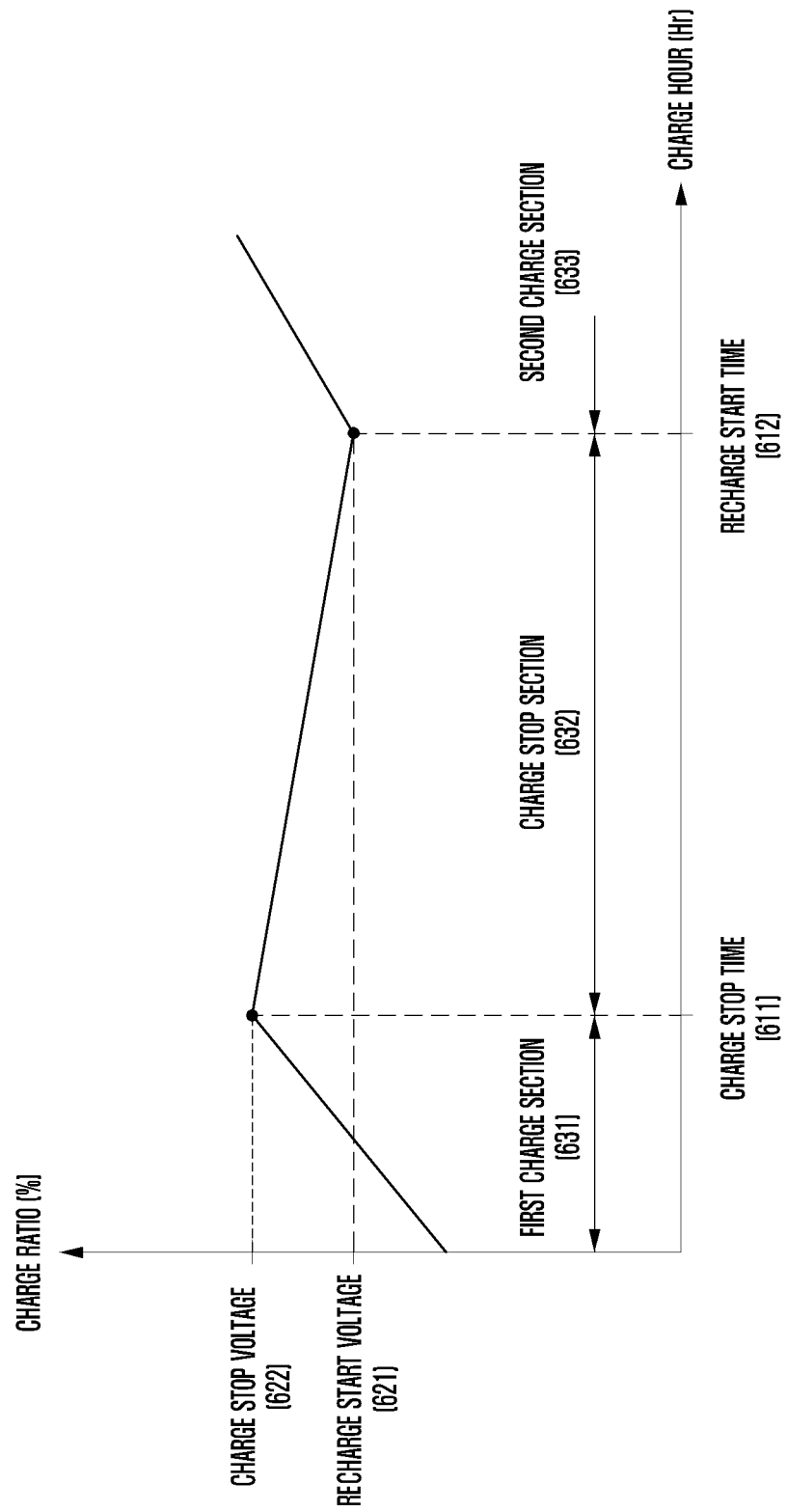
FIG. 6 is a graph showing a charge stop section according to an embodiment of the present disclosure.

FIG. 6 is a graph showing a charge stop section according to an embodiment of the present disclosure.

In accordance with an embodiment, the processor 120 may block the voltage or current, supplied to the battery 189, in a charge stop section 632 (e.g., the charge stop section 442 of FIG. 4). For example, when the voltage of the battery 189 reaches a charge stop voltage 622 (e.g., the charge stop voltage 422 of FIG. 4), the battery 189 switches from the charged state to a discharged state.

FIG. 6 shows that the battery 189 may be managed in the discharged state in the charge stop section 632. For example, the processor 120 may charge the battery 189 up to the charge stop voltage 622 in a first charge section 631 (e.g., the first charge section 441 of FIG. 4). Thereafter, when the charge stop section 632 is entered, the processor 120 may block the voltage or current supplied to the battery 189. For example, the processor 120 may switch the state of the battery 189 from the charged state to the discharged state. When the battery 189 switches to the discharged state, the electronic device 101 consumes power from the battery 189. As power is consumed, the voltage of the battery 189 entering a second charge section 633 (e.g., the second charge section 443 of FIG. 4) may be lower than the charge stop voltage 622. That is, a recharge start voltage 621 of the battery 189 at a recharge start time 612 (e.g., the recharge start time 413 of FIG. 0.4) may be lower than the charge stop voltage 622 at a charge stop time 611 (e.g., the charge stop time 412 of FIG. 4).

Figure 7:
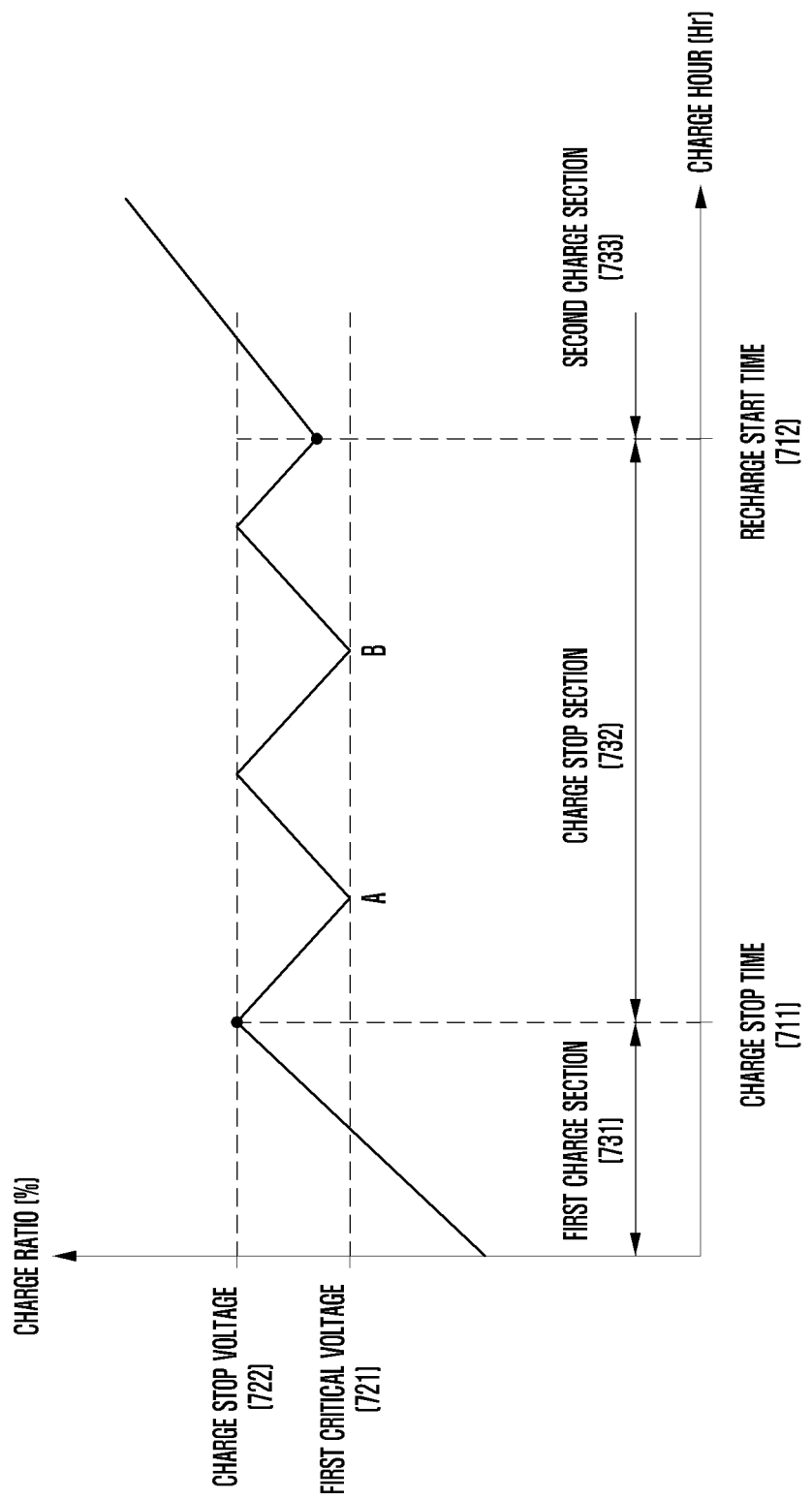
FIG. 7 is a graph showing a charge stop section according to an embodiment of the present disclosure.

FIG. 7 is a graph showing a charge stop section according to an embodiment of the present disclosure.

In accordance with an embodiment, the processor 120 may supply a voltage or current so that the battery 189 can maintain a constant voltage state in a charge stop section 732 (e.g., the charge stop section 442 of FIG. 4). For example, when a critical voltage is set and the voltage of the battery 189 reaches the critical voltage, the processor 120 may supply a voltage or current so that the battery 189 can maintain the charge stop voltage.

FIG. 7 shows that the voltage of the battery 189 may be managed in a constant voltage state in the charge stop section 732. The processor 120 may set a first critical voltage 721 and supply a voltage or current to the battery 189. The first critical voltage 721 may be set depending on the charge stop voltage 722. For example, the processor 120 may charge the battery 189 up to the charge stop voltage 722 (e.g., the charge stop voltage 422 of FIG. 4) in a first charge section 731 (e.g., the first charge section 441 of FIG. 4). When charge stop time 711 (e.g., the charge stop time 412 of FIG. 4) is reached, the processor 120 may switch the state of the battery 189 from the charged state to the discharged state. The voltage of the battery 189 may drop from the charge stop voltage 722 to the first critical voltage 721 over time. The processor 120 may then charge the battery 189 up to the charge stop voltage 722 by supplying a voltage or current again at time A. When the charge stop voltage 722 is reached, the processor 120 may switch the state of the battery 189 again from the charged state to the discharged state. The voltage of the battery 189 may again drop to the first critical voltage 721 over time. The processor 120 may again charge the battery 189 up to the charge stop voltage 722 by supplying a voltage or current again at time B. The processor 120 repeats such a process until second charge section 733 (e.g., the second charge section 443 of FIG. 4) is entered, so the battery 189 can maintain a constant charge stop voltage. When recharge start time 712 (e.g., the recharge start time 413 of FIG. 0.4) is reached, the processor 120 may charge the battery 189 in the second designated mode. In this case, the voltage of the battery 189 at the recharge start time 712 may be equal to or lower than the charge stop voltage 722.

Figure 8:
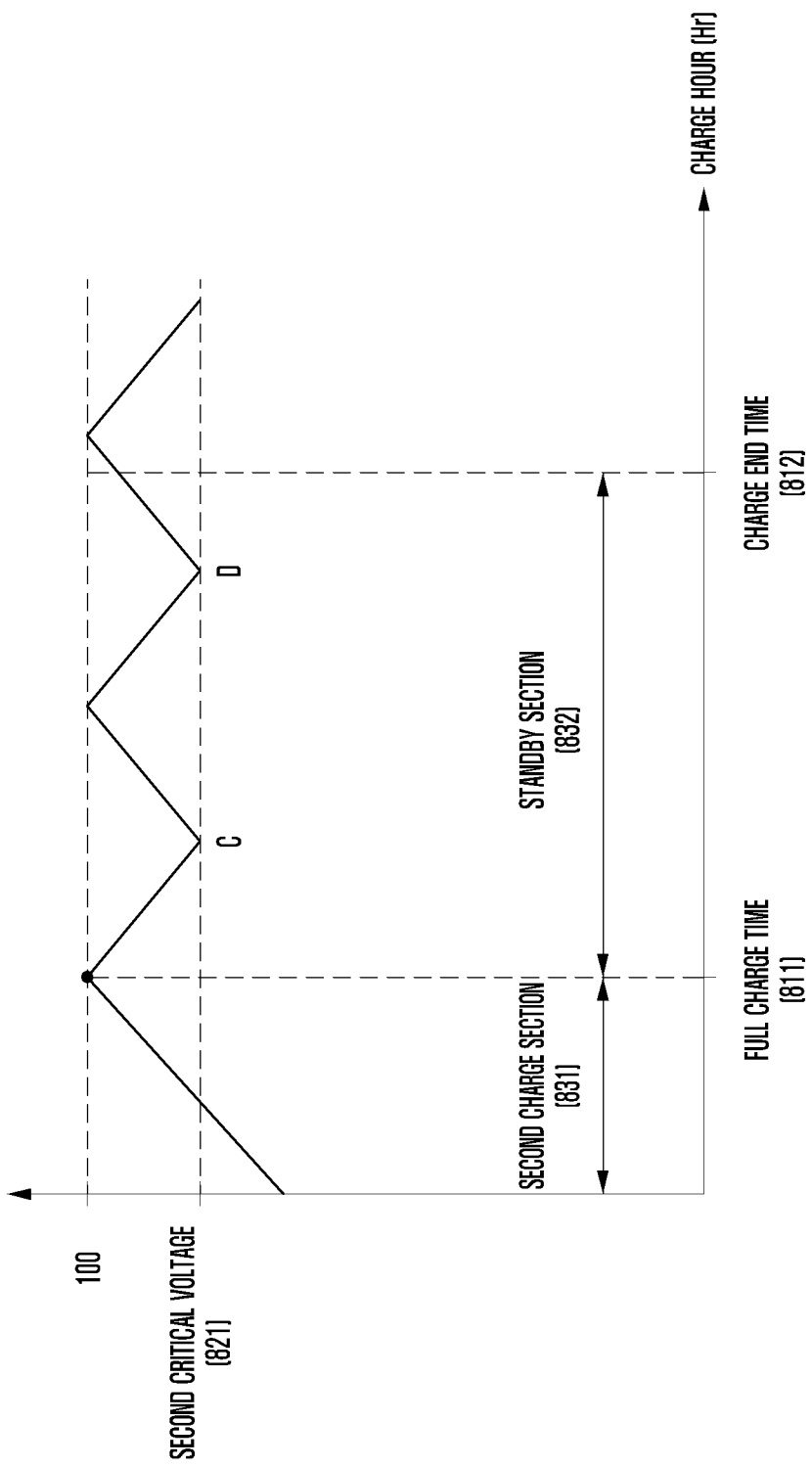
FIG. 8 is a graph showing a standby section according to an embodiment of the present disclosure.

FIG. 8 is a graph showing a standby section according to an embodiment of the present disclosure.

In accordance with an embodiment, when the voltage of the battery 189 reaches the full charge voltage, the processor 120 may supply a voltage or current so that the battery 189 can maintain a constant full charge voltage. For example, when a critical voltage is set and the voltage of the battery 189 reaches the critical voltage, the processor 120 may supply a voltage or current so that the battery 189 can maintain the full charge voltage.

FIG. 8 shows that the voltage of the battery 189 may be managed in a constant voltage state when the voltage is the full charge voltage. The processor 120 may set a second critical voltage 821 and supply a voltage or current to the battery 189. The second critical voltage 821 may be set depending on the full charge voltage. For example, when full charge time 811 (e.g., the full charge time 414 of FIG. 4) is reached, the processor 120 may switch the state of the battery 189 from the charged state to the discharged state. The voltage of the battery 189 may drop from the full charge voltage to the second critical voltage 821 over time. The processor 120 may then charge the battery 189 up to the full charge voltage by supplying a voltage or current again at time C. In this case, the processor 120 may charge the battery 189 in a fourth designated mode. The charging time in the fourth designated mode may be slower than or equal to that of the first designated mode used in the first charge section or the second designated mode used in the second charge section. When the full charge voltage is reached, the processor 120 may switch the state of the battery 189 from the charged state to the discharged state. The voltage of the battery 189 may again drop up to the second critical voltage 821 over time. The processor 120 may again charge the battery 189 up to the full charge voltage by supplying a voltage or current again at time D. The processor 120 repeats such a process until a standby section 832 (e.g., the standby section 444 of FIG. 4) is terminated, so the battery 189 can maintain a constant full charge voltage. In accordance with one embodiment, the processor 120 may control the battery 189 to maintain a constant full charge voltage until the standby section 832 is terminated.

The processor 120 of the electronic device according to certain embodiments disclosed herein may calculate the charge time to charge up to the full charge voltage by taking into consideration charge power set in the second charge section 831 in order to minimize the recharge process in the standby section 832. For example, the standby section may be set to be 10 minutes. In another embodiment, the standby section may be omitted because the time it takes to reach the full charge voltage is identical with the charge end time.

Figure 9:
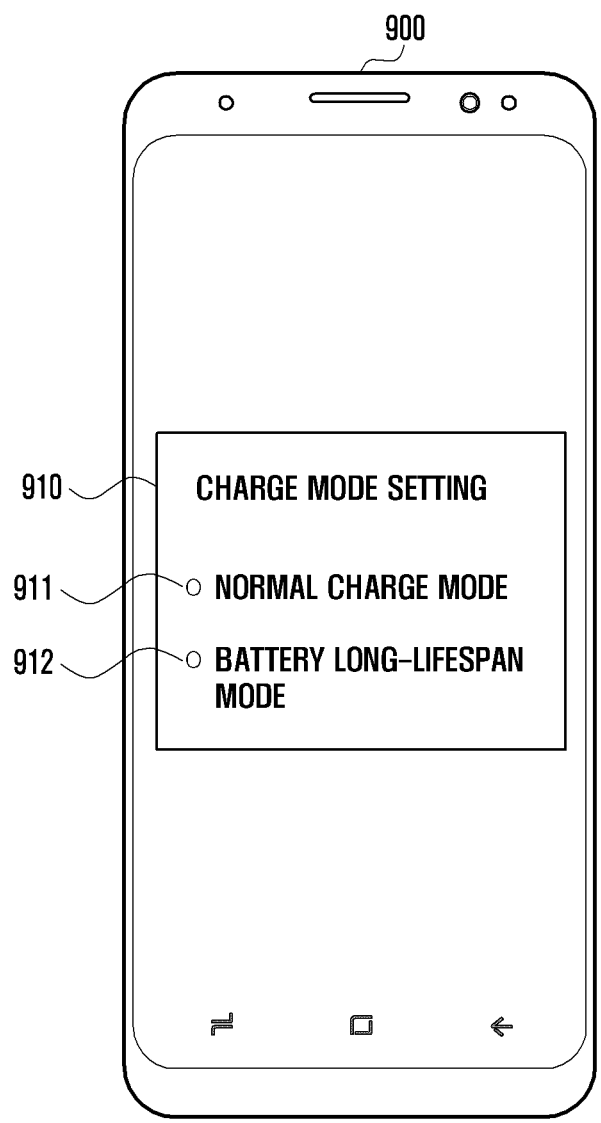
FIG. 9 is a diagram showing a user interface according to an embodiment of the present disclosure.

FIG. 9 is a diagram showing a user interface according to an embodiment of the present disclosure.

An electronic device 900 may provide a user interface so that the user can select various charge modes for the battery. For example, FIG. 9 shows an embodiment in which a pop-up window 910 is provided to the user so that the user can select one of a normal charge mode 911 or a battery long-lifespan mode 912.

For example, when the user selects the normal charge mode, the electronic device may not employ the charge stop section disclosed above and may supply a constant current or a constant voltage until the battery reaches a full charge voltage. In accordance with one embodiment, the electronic device may charge the battery at high speed until the battery reaches the full charge voltage.

For another example, when the user selects the battery long-lifespan mode, the electronic device may apply the charge stop section disclosed herein so that damage to the battery is minimized. In accordance with one embodiment, the electronic device may identify whether an external power source for charging the battery has been connected to the electronic device, may identify a voltage of the battery when connection of the external power source is identified, may determine a charge start time based on at least the time when the connection of the external power source is identified, may determine a charge end time based on at least situation information related to the electronic device, may determine the charge stop time of the battery based on at least the charge start time, the charge end time and the voltage of the battery when a difference between the charge start time and the charge end time satisfies a designated threshold, may divide the period between the charge start time and the charge end time into a first charge section, a charge stop section and a second charge section based on at least the charge stop time, and may perform the charging of the battery.

Figure 10:
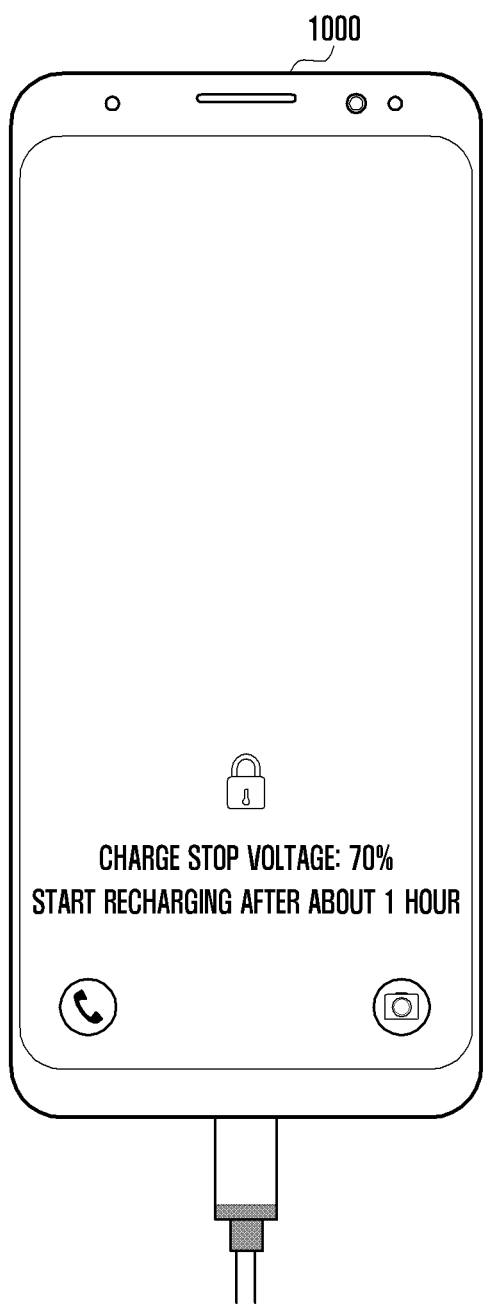
FIG. 10 is a diagram showing a user interface according to an embodiment of the present disclosure.

FIG. 10 is a diagram showing a user interface according to an embodiment of the present disclosure.

If charging according to the battery long-lifespan mode is performed, an electronic device 1000 may provide a user interface so that the user can check the charge condition of a battery. FIG. 10 shows an example of a user interface notifying the user that the charge stop section has been entered. For example, the electronic device 1000 may notify the user that the voltage of the battery has reached the charge stop voltage (e.g., 70%) and also notify the user of the time (e.g., about 1 hour) left until the second charge section begins. Although not shown, the electronic device 1000 may notify the user that the first charge section or the second charge section has been entered. In accordance with another embodiment, the electronic device 1000 may notify the user when the voltage of the battery is expected to reach full charge.

The electronic device and the method of controlling the charge of the same according to certain embodiments of the present disclosure can prevent the deterioration of batteries and increase the lifespan of the batteries by managing a charge stop section which takes into consideration the physical properties of the batteries. The charge speed may also be varied depending on the voltage of the batteries.

The electronic device and the method of controlling the charge of the same according to certain embodiments of the present disclosure can prevent the deterioration of batteries and increase the lifespan of the batteries by controlling the charging of the batteries such that the voltages of the batteries are at full voltage for a short period of time.

The electronic device and the method of controlling the charge of the same according to certain embodiments of the present disclosure can prevent safety accidents, such as the ignition or explosion of batteries, by preventing swelling of the batteries.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device, comprising:
a battery; and
at least one processor,
wherein the processor is configured to:
identify whether an external power source for charging the battery is connected to the electronic device,
identify a voltage of the battery when connection of the external power source is identified,
determine a charge start time based on time when the connection of the external power source is identified,
determine a charge end time based on situation information related to the electronic device,
determine a charge stop time of the battery based on the charge start time, the charge end time and the voltage of the battery when a difference between the charge start time and the charge end time satisfies a designated threshold, and
divide a period between the charge start time and the charge end time into a first charge section, a charge stop section and a second charge section based on the charge stop time and perform charging of the battery based on the divided period.

2. The electronic device of claim 1, wherein:
the processor is further configured to charge the battery in a first designated mode in the first charge section and charge the battery in a second designated mode in the second charge section, and
charge power in the first designated mode is higher than charge power in the second designated mode.

3. The electronic device of claim 2, wherein the processor is further configured to charge the battery with charge power in a third designated mode higher than or equal to the charge power in the first designated mode when the difference between the charge start time and the charge end time does not satisfy the designated threshold.

4. The electronic device of claim 1, wherein the processor is further configured to:
divide the first charge section into a plurality of sections, and
charge the battery in modes respectively designated in the plurality of sections.

5. The electronic device of claim 1, wherein the processor is further configured to block voltage or current supplied to the battery in the charge stop section.

6. The electronic device of claim 1, wherein the processor is further configured to supply voltage or current from the external power source in the charge stop section so that the battery maintains a constant voltage state in the charge stop section.

7. The electronic device of claim 1, wherein the charge start time is determined based on at least one of time when the external power source is connected in a wired manner through a connection terminal, time when the external power source is wirelessly connected through an antenna module, and time when power starts to be supplied to the battery from the external power source.

8. The electronic device of claim 1, wherein the situation information related to the electronic device comprises at least one of a user's use pattern for the electronic device, a user's schedule information stored in the electronic device or an external electronic device, and information on a surrounding environment of the electronic device.

9. The electronic device of claim 1, wherein the designated threshold comprises at least one of a predetermined difference between the charge end time and the charge start time and time when a full charge voltage is reached in a normal or high-speed charge mode of the battery.

10. The electronic device of claim 1, wherein the processor is further configured to:
block voltage or current supplied to the battery until the voltage of the battery reaches a designated critical voltage after the battery is charged up to a full charge voltage, and
charge the battery in a fourth designated mode when the voltage of the battery reaches the designated critical voltage.

11. The electronic device of claim 2, wherein the processor is further configured to determine the second designated mode so that the charging of the battery is terminated before or at the charge end time.

12. An electronic device, comprising:
a battery; and
at least one processor,
wherein the processor is configured to:
identify whether an external power source for charging the battery is connected to the electronic device,
identify a voltage of the battery when connection of the external power source is identified,
determine a charge start time based on time when the connection of the external power source is identified,
determine a charge end time based on situation information related to the electronic device,
identify whether the voltage of the battery is smaller than a designated charge stop voltage when a difference between the charge start time and the charge end time satisfies a designated threshold, and
divide a period between the charge start time and the charge end time into a first charge section, a charge stop section and a second charge section based on the designated charge stop voltage when the voltage of the battery is smaller than the designated charge stop voltage and perform charging of the battery based on the divided period.

13. The electronic device of claim 12, wherein the processor is further configured to:
divide the period between the charge start time and the charge end time into a charge stop section and a charge section when the voltage of the battery is greater than or equal to the designated charge stop voltage.

14. A method of controlling charging of an electronic device comprising a battery, the method comprising:
    identifying whether an external power source for charging the battery is connected to the electronic device;
    identifying a voltage of the battery when connection of the external power source is identified;
    determining a charge start time based on time when the connection of the external power source is identified;
    determining a charge end time based on situation information related to the electronic device;
    determining a charge stop time of the battery based on the charge start time, the charge end time and the voltage of the battery when a difference between the charge start time and the charge end time satisfies a designated threshold; and
    dividing a period between the charge start time and the charge end time into a first charge section, a charge stop section and a second charge section based on the charge stop time and performing charging of the battery based on the divided period.

15. The method of claim 14, further comprising:
    charging the battery in a first designated mode in the first charge section; and
    charging the battery in a second designated mode in the second charge section,
    wherein charge power in the first designated mode is higher than charge power in the second designated mode.

16. The method of claim 15, further comprising charging the battery with charge power in a third designated mode higher than or equal to the charge power in the first designated mode when the difference between the charge start time and the charge end time does not satisfy the designated threshold.

17. The method of claim 14, further comprising:
    dividing the first charge section into a plurality of sections, and
    charging the battery in modes respectively designated in the plurality of sections.

18. The method of claim 14, further comprising blocking voltage or current supplied to the battery in the charge stop section.

19. The method of claim 15, further comprising supplying voltage or current from the external power source in the charge stop section so that the battery maintains a constant voltage state in the charge stop section.

20. The method of claim 14, further comprising:
    blocking voltage or current supplied to the battery until the voltage of the battery reaches a designated critical voltage after the battery is charged up to a full charge voltage, and
    charging the battery in a fourth designated mode when the voltage of the battery reaches the designated critical voltage.

* * * * *